UNITED STATES PATENT OFFICE.

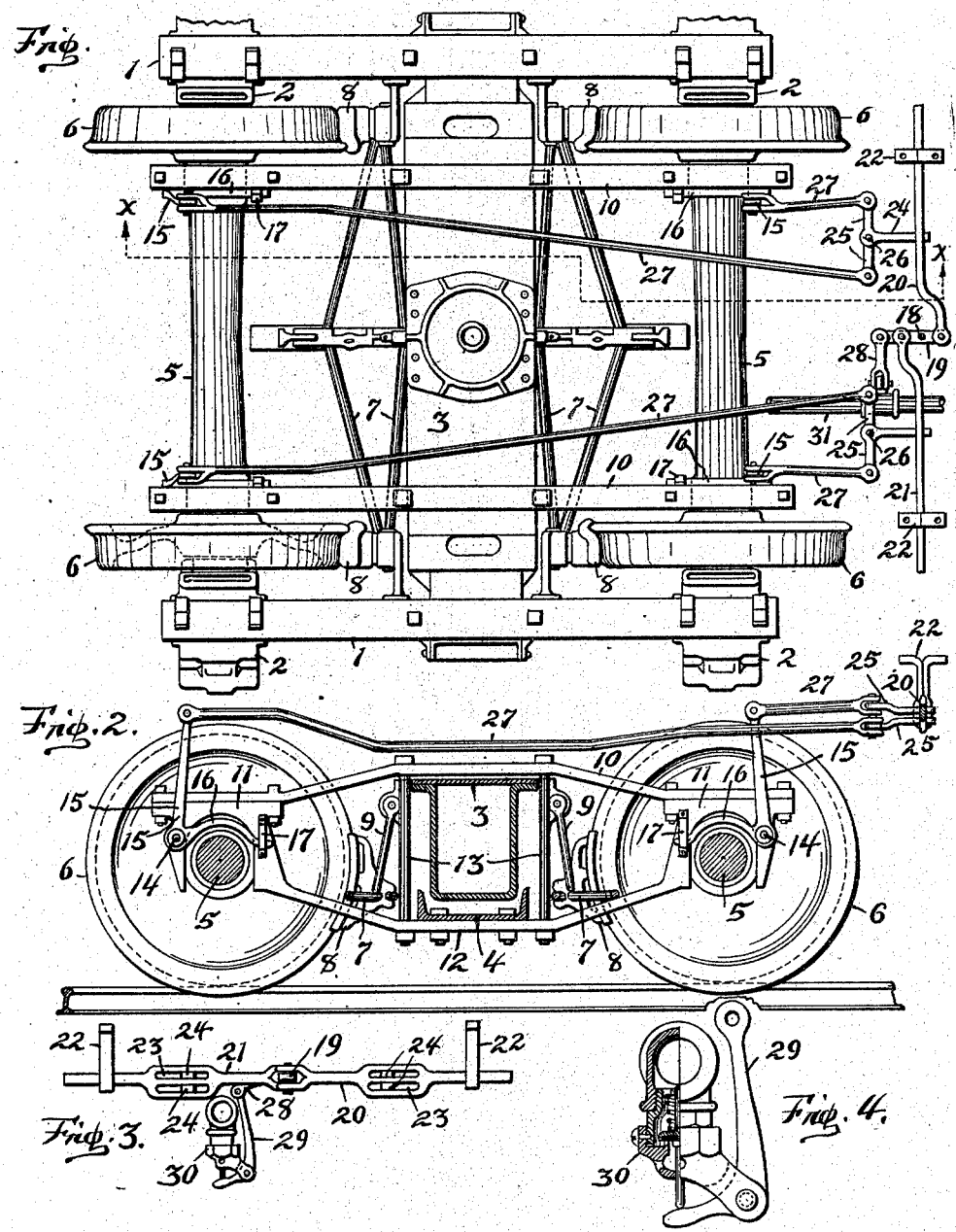

LOUIS N. WICKERT, OF FORT WAYNE, INDIANA.

SAFETY ATTACHMENT FOR CAR-TRUCKS.

1,291,323.  Specification of Letters Patent.  Patented Jan. 14, 1919.

Application filed July 31, 1918. Serial No. 247,504.

*To all whom it may concern:*

Be it known that I, LOUIS N. WICKERT, citizen of the United States of America, and resident of Fort Wayne, in the county of Allen and State of Indiana, have invented certain new and useful Improvements in Safety Attachments for Car-Trucks, of which the following is a specification.

This invention relates to improvements in safety attachments for car trucks, and the objects thereof are to provide means of support for the frame of the truck in the event of a broken journal or of a broken frame; to afford automatic means of applying the air-brakes of the train in the event of a broken axle or journal, or should the truck become slued; and also to provide emergency supports for the brake-beams of the truck, that prevent the same from falling to the ground when accidentally detached from their hangers.

The objects of the invention are accomplished by the construction illustrated in the accompanying darwings in which Figure 1 is a plan view of a car-truck equipped with the invention; Fig. 2, is an elevation of Fig. 1 in vertical section on the line X—X thereof; Fig. 3, is a detail view showing an elevation of the shifting bars that form part of the mechanism for applying the air-brakes; and Fig. 4, is a detail view, partly in section, showing the air valve.

Similar characters of reference indicate corresponding parts throughout the several views, and having reference now to the same:

The car truck shown in the drawings is of the usual construction, comprising the arch-plates 1, journal-boxes 2, bolster 3, sand-plank 4, axles 5, and wheels 6. Brake-beams 7, having shoes 8, are suspended from hangers 9 attached to the truck in the usual manner.

At each side of the truck, in a vertical plane adjacent the inner faces of the car wheels, is arranged a supplemental frame 10 having at its opposite extremities axle-bearings 11 that extend over the corresponding axles 5. The lower part 12 of each frame 10 is fixedly attached to the sand plank 4 so that the frame is rigidly held thereby in position in the truck. Each frame has a vertical post 13, arranged respectively upon opposite sides of the bolster, which afford stability. When in normal position, the axle-bearings 11 are held from contact with the axles 5. Each end of the frame has a stud 14 upon which is pivotally mounted a corresponding bell-crank 15 the lower arm 16 of which extends slightly above and normally out of contact with the corresponding axle 5. It is the intention that as the axle-bearing moves downwardly onto the axle, the bell-crank will first contact with the axle and become turned upon its pivotal support 14. A keeper, 17, attached to the frame, is provided for the lower arm of each bell-crank to prevent lateral movement thereof.

Upon a stationary pivot 18 is mounted a lever 19 having secured thereto, upon opposite sides of the pivot, sliding bars 20 and 21 respectively supported in corresponding brackets 22, and each having a pair of slots 23. Into the slots of each bar loosely extend projecting arms 24 of corresponding bell-cranks 25 that are mounted upon stationary pivots 26, and the opposite ends of the respective bell-cranks 25 are coupled with the upper arms of the bell-cranks 15 correspondingly through the medium of the connecting rods 27. Thus, upon the action of any one of the bell-cranks 15. the lever 19 will become turned upon its pivotal support 18. At one end of the lever 19 is attached a coupling 28 which has also connection with the operating lever 29 of the escape valve 30. so that as the lever 19 is turned the valve becomes operated and air in the train pipe 31 is thereby allowed to escape and the air-brake system of the train consequently applied.

The frames 10 also serve as a safety expedient as they arrest the fall of the brake-beams 7 in the event of their becoming loosened from their supporting hangers.

In the operation of this invention the truck proper, consisting of the arch-plates, journal-boxes, bolster, sand-plank, axles, wheels, and brake-beams with their shoes, functions in the customary manner, and the car body (not shown) having the train air-pipe 31, affords anchorage for the stationary pivots 18 and 26, and also for the brackets 22. The escape-valve 30 communicating with the train air-pipe 31 together with the other parts, enumerated above, composing the invention, are carried along with the general equipment and function only in the event of accidental misbehavior of the truck proper or of its parts. Such, for example, as the breaking of an axle or the burning off of one of its journals, or the derailment or sluing of the truck.

What I claim is:

1. In combination with a truck proper, two supplemental frames secured to the truck, one at each side thereof located adjacent the inner faces of the corresponding wheels, and each having at its opposite ends axle-bearings extending above and normally out of contact with the respective adjacent axles; means in supported relation with each axle-bearing, normally out of contact with the axle, adapted to become actuated when the axle-bearing moves into contact with the corresponding axle; an escape-valve in connection with a train air-pipe; and mechanism having connection between the valve and said means for operating the former when the latter is actuated.

2. In apparatus of the class described, a car truck, including a frame proper and axles journaled therein; supplemental frames fixed in the frame proper and having axle-bearings normally out of contact with the axles and adapted to bear thereupon and support the frame proper upon failure of the journals of the axles or frame proper; an air-valve for applying the air-brakes of the train; and mechanism coöperative with the supplemental frames adapted to actuate the valve.

In testimony whereof I affix my signature, in presence of two witnesses.

LOUIS N. WICKERT.

Witnesses:
MARIE A. HARTMAN,
W. G. BURNS.